(12) United States Patent
Graylin

(10) Patent No.: US 9,195,983 B2
(45) Date of Patent: Nov. 24, 2015

(54) SYSTEM AND METHOD FOR A SECURE CARDHOLDER LOAD AND STORAGE DEVICE

(71) Applicant: Will W. Graylin, Saugus, MA (US)

(72) Inventor: Will W. Graylin, Saugus, MA (US)

(73) Assignee: Roam Data Inc., Boston, MA (US)

( * ) Notice: Subject to any disclaimer, the term of this patent is extended or adjusted under 35 U.S.C. 154(b) by 0 days.

(21) Appl. No.: 13/756,620

(22) Filed: Feb. 1, 2013

(65) Prior Publication Data

US 2013/0140360 A1  Jun. 6, 2013

Related U.S. Application Data

(63) Continuation-in-part of application No. 13/080,047, filed on Apr. 5, 2011.

(60) Provisional application No. 61/594,474, filed on Feb. 3, 2012.

(51) Int. Cl.
*G06Q 20/32* (2012.01)
*G06Q 20/40* (2012.01)
(Continued)

(52) U.S. Cl.
CPC .............. *G06Q 20/322* (2013.01); *G06Q 20/32* (2013.01); *G06Q 20/3278* (2013.01); *G06Q 20/353* (2013.01); *G06Q 20/36* (2013.01); *G06Q 20/4016* (2013.01); *G06Q 30/02* (2013.01); *G06Q 30/0201* (2013.01); *G06Q 30/04* (2013.01); *G06Q 30/06* (2013.01);
(Continued)

(58) Field of Classification Search
CPC ....... G06Q 20/20; G06Q 20/22; G06Q 20/32; G06Q 20/36

USPC ............................... 235/380, 492; 705/39, 64
See application file for complete search history.

(56) References Cited

U.S. PATENT DOCUMENTS 5,739,512 A   4/1998  Tognazzini
6,804,627 B1  10/2004 Marokhovsky et al.
(Continued)

FOREIGN PATENT DOCUMENTS

KR   1020020064473 A   9/2002
KR   10-2007-0016893 A  2/2007
(Continued)

OTHER PUBLICATIONS

International Search Report dated May 8, 2013 for corresponding International PCT Application No. PCT/US2013/024578, 3.
(Continued)

*Primary Examiner* — Allyson Trail
(74) *Attorney, Agent, or Firm* — Ohlandt, Greeley, Ruggiero & Perle, L.L.P.

(57) ABSTRACT

A system for a secure cardholder and storage device includes a mobile communication device and a secure card transporter (SCT). The SCT includes a Near Field Communication (NFC) chip, a microprocessor, a magnetic stripe card reader, a contact chip card reader, a contactless card reader, an audio jack interface and a micro-USB interface. The SCT interfaces with the mobile communication device via the audio jack interface or the micro-USB interface, and the SCT captures payment card data and transmits the captured payment card data to a merchant point of sale (POS) checkout system both in the physical and virtual environments. The system provides convenient buying experience for buyers, and secure and informative transaction for sellers.

18 Claims, 1 Drawing Sheet

(51) Int. Cl.
    *G06Q 30/02*     (2012.01)
    *G06Q 30/04*     (2012.01)
    *G06Q 30/06*     (2012.01)
    *G06Q 40/02*     (2012.01)
    *G06Q 20/34*     (2012.01)
    *H04L 29/08*     (2006.01)
    *H04W 4/00*     (2009.01)
    *G06Q 20/36*     (2012.01)

(52) U.S. Cl.
    CPC ........ *G06Q30/0603* (2013.01); *G06Q 30/0613* (2013.01); *G06Q 40/02* (2013.01); *H04L 67/02* (2013.01); *H04W 4/008* (2013.01)

(56) References Cited

U.S. PATENT DOCUMENTS

| | | |
|---|---|---|
| 7,480,631 B1 | 1/2009 | Merced et al. |
| 7,797,192 B2 | 9/2010 | Mitchell et al. |
| 7,809,169 B2 | 10/2010 | Martinez |
| 7,866,553 B2 | 1/2011 | Liu et al. |
| 8,600,855 B2 | 12/2013 | Winters et al. |
| 2003/0055792 A1 | 3/2003 | Kinoshita et al. |
| 2003/0084301 A1 | 5/2003 | Krawetz |
| 2003/0216983 A1 | 11/2003 | Bodin |
| 2003/0217000 A1 | 11/2003 | Wichman |
| 2004/0016801 A1* | 1/2004 | Newsome et al. ............ 235/382 |
| 2004/0133787 A1 | 7/2004 | Doughty et al. |
| 2004/0225567 A1 | 11/2004 | Mitchell et al. |
| 2004/0230490 A1 | 11/2004 | Barsade et al. |
| 2004/0230525 A1 | 11/2004 | Barsade et al. |
| 2004/0254896 A1 | 12/2004 | Barsade et al. |
| 2005/0087598 A1 | 4/2005 | Yamanaka |
| 2005/0165651 A1 | 7/2005 | Mohan |
| 2005/0222961 A1 | 10/2005 | Staib et al. |
| 2005/0246278 A1 | 11/2005 | Gerber et al. |
| 2006/0160487 A1 | 7/2006 | Nam et al. |
| 2007/0005511 A1 | 1/2007 | Martinez |
| 2007/0069013 A1 | 3/2007 | Seifert et al. |
| 2007/0094088 A1 | 4/2007 | Mastie et al. |
| 2007/0130463 A1 | 6/2007 | Law et al. |
| 2007/0131759 A1 | 6/2007 | Cox et al. |
| 2007/0192178 A1 | 8/2007 | Fung et al. |
| 2008/0126260 A1 | 5/2008 | Cox et al. |
| 2008/0245851 A1 | 10/2008 | Kowalski |
| 2008/0294538 A1 | 11/2008 | Barsade et al. |
| 2009/0024471 A1 | 1/2009 | Nielson et al. |
| 2009/0144456 A1 | 6/2009 | Gelf et al. |
| 2009/0234773 A1 | 9/2009 | Hasson |
| 2009/0277958 A1* | 11/2009 | Lobo ............................ 235/380 |
| 2009/0307132 A1 | 12/2009 | Phillips |
| 2010/0010905 A1 | 1/2010 | Arzumanyan et al. |
| 2010/0010908 A1 | 1/2010 | Pasupulati et al. |
| 2010/0023449 A1 | 1/2010 | Skowronek |
| 2010/0048247 A1 | 2/2010 | Markison |
| 2010/0070375 A1 | 3/2010 | Lane et al. |
| 2010/0161466 A1 | 6/2010 | Gilder |
| 2010/0217707 A1 | 8/2010 | Phillips |
| 2010/0299212 A1 | 11/2010 | Graylin et al. |
| 2011/0040640 A1 | 2/2011 | Erikson |
| 2011/0084139 A1 | 4/2011 | McKelvey et al. |
| 2011/0153496 A1 | 6/2011 | Royyuru |
| 2011/0218911 A1 | 9/2011 | Spodak |
| 2011/0312270 A1 | 12/2011 | White |
| 2013/0146661 A1* | 6/2013 | Melbrod et al. .............. 235/435 |
| 2013/0200999 A1* | 8/2013 | Spodak et al. ............... 340/5.65 |
| 2014/0074698 A1* | 3/2014 | Poole et al. ..................... 705/39 |
| 2014/0221040 A1* | 8/2014 | de Moraes ................ 455/550.1 |

FOREIGN PATENT DOCUMENTS

| | | |
|---|---|---|
| KR | 10-2011-0006732 A | 1/2011 |
| KR | 10-1080306 B1 | 11/2011 |
| WO | 02-05152 A1 | 1/2002 |
| WO | 2010111130 A2 | 9/2010 |

OTHER PUBLICATIONS

International Written Opinion dated May 8, 2013 for corresponding International PCT Application No. PCT/US2013/024578, 4 pages.
International Search Report dated Mar. 28, 2013 for corresponding International PCT Application No. PCT/US2012/062645, 3 pages.
International Written Opinion dated Mar. 28, 2013 for corresponding International PCT Application No. PCT/US2012/062645, 5 pages.
European Communication dated Aug. 12, 2012 for corresponding European Patent Application No. 10841410.3, 2 pages.
International Preliminary Report on Patentability dated Jul. 4, 2012 for corresponding International PCT Application No. PCT/US2010/044638.
International Search Report dated May 1, 2012 for corresponding International PCT Application No. PCT/US2011/031323, 4 pages.
International Written Opinion dated May 1, 2012 for corresponding International PCT Application No. PCT/US2011/031323, 5 pages.
International Search Report dated Jan. 27, 2011 for corresponding International PCT Application No. PCT/US2010/044638, 3 pages.
International Written Opinion dated Jan. 27, 2011 for corresponding International PCT Application No. PCTUS/2010/044638, 3 pages.
International Preliminary Examination Report on Patentability dated May 15, 2014 from PCT/US2012/062645, 7 pages.
European Search Report dated Aug. 7, 2015 from corresponding International Application No. EP13743780, 5 pages.
"NFC-Dongle" Add-on Package, XP-002541672, Jun. 18, 2008 (Internet Citation), 2 pages.

* cited by examiner

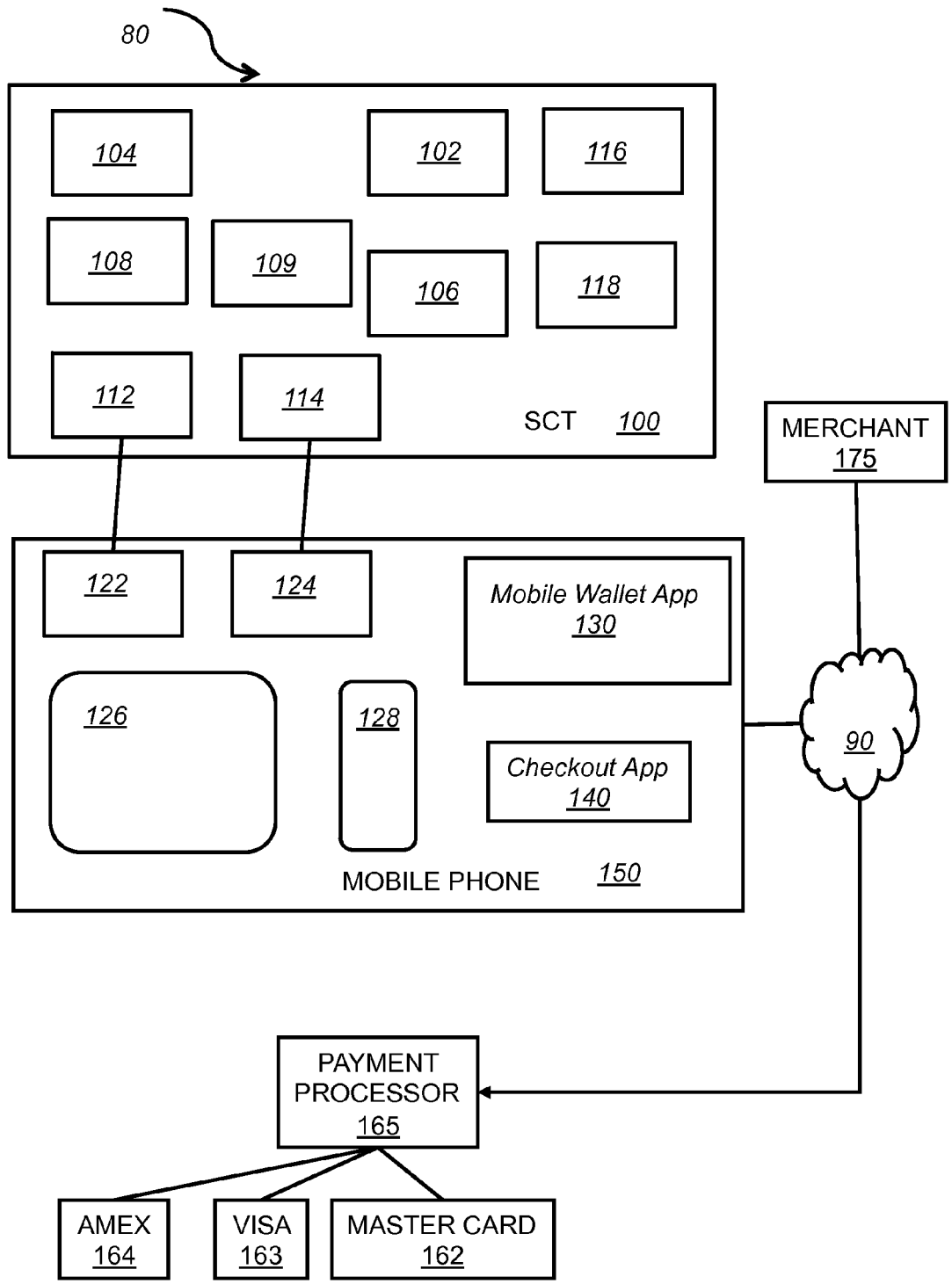

SYSTEM AND METHOD FOR A SECURE CARDHOLDER LOAD AND STORAGE DEVICE

CROSS REFERENCE TO RELATED CO-PENDING APPLICATIONS

This application claims the benefit of U.S. provisional application Ser. No. 61/594,474 filed on Feb. 3, 2012 and entitled SYSTEM AND METHOD FOR A SECURE CARDHOLDER LOAD AND STORAGE DEVICE, which is commonly assigned and the contents of which are expressly incorporated herein by reference.

This application is a continuation in part of U.S. application Ser. No. 13/080,047 filed on Apr. 5, 2011 and entitled SYSTEM AND METHOD FOR CHECKOUT AND CUSTOMER DATA CAPTURE IN COMMERCE APPLICATIONS, which is commonly assigned and the contents of which are expressly incorporated herein by reference.

FIELD OF THE INVENTION

The present invention relates to a system and a method for a secure cardholder load and storage device that interfaces with a consumer remote device for capturing and transmitting payment card present data to merchants via merchant point of sale (POS) checkout systems, in the physical and virtual environments.

BACKGROUND OF THE INVENTION

Near Field Communication (NFC) chips have been embedded in some mobile phones directly or via SD Memory Cards, or SIM Cards, and are used by companies such as Google or ISIS as digital wallets for storing secure cardholder information. These NFC chip based digital wallets are used in contactless payment transactions with point-of-sale (POS) devices that support such contactless transactions. Mobile phones with the embedded NFC chip based digital wallets have several problems with complexity, applicability, security, and flexibility, among others. One of these problems is that not all phones have an embedded NFC chip. This severely limits penetration of this mobile wallet solution to the public. Furthermore, the process for loading the NFC chip's secure element with the payment card data is complex to implement and carry out. In particular, data loading onto the NFC chip's secure element over the air has security issues that need to be addressed. These security issues exist at every point the cardholder data touches in order to get from an issuer to the secure element. Currently, a Trusted Security Manager (TSM) is required for loading personal payment credentials onto the NFC chip's secure element over the air. Payment card issuers have to sign up for such a TSM service and to pay for such services. Furthermore, there are various technical complexities in order to make the loading process work smoothly, especially when some part of the loading process fails in the middle. Furthermore, not all standards have been worked out, and there are multiple competing parties making it more difficult to become ubiquitous. The applications and value proposition for the consumers and for the merchants are limited if the only purpose is to allow NFC to be used for contactless payment in POS devices. More value has to be created for the consumers and merchants and the process has to be much less complex for issuers, and consumers to load their digital wallet, and for them to use it with merchants.

SUMMARY OF THE INVENTION

The present invention relates to a system and a method for a secure cardholder storage and transport device that works in conjunction with an application in order to capture payment card data, to securely store the captured payment card data, and to transmit card present data to merchants via merchant point-of-sale (POS) checkout systems, both in the physical and virtual environments. The system provides convenient buying experience for buyers, and secure and informative transaction for sellers.

In general, in one aspect the invention features a system for a secure cardholder and storage device including a mobile communication device and a secure card transporter (SCT). The SCT includes a Near Field Communication (NFC) chip, a microprocessor, a magnetic stripe card reader, a contact chip card reader, a contactless card reader, an audio jack interface and a micro-USB interface. The SCT interfaces with the mobile communication device via the audio jack interface or the micro-USB interface, and the SCT captures payment card data and transmits the captured payment card data to a merchant point of sale (POS) checkout system.

Implementations of this aspect of the invention may include one or more of the following features. The mobile communication device includes a mobile wallet application that initializes and unlocks the SCT. The mobile communication device further includes a payment checkout application that interacts with the SCT and accepts payment card data from the SCT. The mobile wallet application interacts with the SCT in order to provide mode of operations including "card emulation mode", "card load mode" and "card read mode". The SCT operated in the "card emulation mode" is configured to allow a user to select a specific payment card and to change payment cards via the mobile wallet application for payment at the merchant POS system. The SCT operated in the "card load mode" is configured to allow a user to load payment card data and to store the loaded payment card data onto a secure element of the NFC chip and onto an online digital wallet via the mobile wallet application. The SCT operated in the "card read mode" is configured to allow a user to retrieve payment card data and to transmit the retrieved payment card data to the merchant POS system. The mobile communication device may be a Smartphone, a tablet, or a personal computer. The SCT further includes a battery and a charging circuit. The microprocessor is configured to provide security and communications with the mobile communication device. The e NFC chip stores payment card data and cardholder data in a secure element. The NFC chip is configured to be used as a contactless payment card that is read by the merchant POS checkout system. The NFC chip is configured to read contactless payment cards and to transmit payment card data to other SCT devices in a peer-to-peer mode.

In general, in another aspect the invention features a method for providing a secure cardholder and storage device including providing a mobile communication device and providing a secure card transporter (SCT). The SCT includes a Near Field Communication (NFC) chip, a microprocessor, a magnetic stripe card reader, a contact chip card reader, a contactless card reader, an audio jack interface and a micro-USB interface. The SCT interfaces with the mobile communication device via the audio jack interface or the micro-USB interface. The SCT captures payment card data and transmits the captured payment card data to a merchant point of sale (POS) checkout system.

Among the advantages of this invention may be one or more of the following. The mobile card reader and storage device can be used with virtually any mobile phone or PC, thereby enabling ubiquity. It is much less complex to load card data onto the secure element of the device. There is no cost to load cards onto the device. It is much less complex to load cards and it minimizes failure points in the process. It does not require standardization of multiple parties, handset makers, TSMs, Chip providers, standards bodies to agree on methodology before users can use the system. The invention also enables a host of applications and functionalities that make it more compelling and deliver value to the consumers and the merchants.

BRIEF DESCRIPTION OF THE DRAWINGS

FIG. 1 is an overview diagram of the secure cardholder load and storage device system.

DETAILED DESCRIPTION OF THE INVENTION

Referring to FIG. 1, the system 80 of the present invention includes a mobile card reader/card storage device (Secure Card Transporter (SCT)) 100 that interfaces with a remote communication device 150 via the audio jack 122 and/or USB port 124 of the device. System 80 also includes a secure mobile wallet application 130 and a payment checkout application 140. The secure mobile wallet application 130 initializes and unlocks the SCT 100 and the payment checkout application 140 interacts with the SCT and accepts card present payment data or tokens from the SCT 100. The remote communication device may be a Smartphone, a tablet, or a PC, among others.

The SCT device 100 includes a micro processor 102, an NFC chip 106, a battery 116, a charging circuit 118, a magnetic stripe reader 104, a contact chip card reader 108, a contactless stripe reader 109, a 3.5 mm audio jack interface 112, and a micro USB port/jack interface 114. Microprocessor 102 handles security and communications with the remote communication device 150. The NFC chip 106 is used for storing cardholder data in its secure element. The NFC chip 106 may also be used as a tag or contactless card, that is read by POS with contactless capabilities. The NFC chip 106 may also be used for reading other contactless cards in certain circumstances, and for transmitting card data to other SCT devices in a peer-to-peer mode. The magnetic stripe reader 104 is used for loading payment card data onto the secure element of the NFC chip 106 and for capturing card track data for a POS application or checkout application on the host remote communication device 150. The remote communication device 150 includes the mobile wallet application 130, a checkout application 140, audio jack port 122, USB port 124, a screen 126 and a keyboard 128. The mobile wallet application 130 on the host device 150 interacts with the SCT 100 in order to control and provide different modes of operation including Card Emulation Mode, Card Load Mode, and Card Read Mode.

To provide better security in usage of the SCT, each SCT device is initially open to be paired with the user's wallet account, and only with one account. Once it is paired, it must be unlocked by the wallet application to change modes and parameters on the SCT. The SCT can store cardholder data by either an initial load at manufacturing, or by an over the air load after setting up a wallet account paired with the SCT, or by the consumer directly loading their SCT via the wallet application on his/her remote communication device by swiping or keying their card information into both the secure element and the user's wallet account. Wallet user is defined as a person that has setup a digital wallet account on the cloud, and has initialized a mobile wallet application on their phone.

Card Emulation Mode: Here a wallet user who enters his application with a PIN can change the modes of how the NFC chip allows the cards in the secure element to be selected and discovered for use by POS card readers. Wallet user can choose the default card being used, user can set the SCT to allow for the default card to be exposed to discovery by contactless readers, or exposed only for a limited time upon entering a PIN to unlock the default card in the mobile wallet app.

Card Load Mode: Upon initializing the SCT, the wallet user can use the Wallet Application to load his/her cards into both the digital wallet in the cloud with permanent account number (PAN) data (not track data), and it can store the track data in an encrypted manner into the secure element of the NFC chip in the SCT for use later in a secure checkout from a merchant. The Top-of-Wallet (default) card is usually the first card loaded, but can be changed by the user. The encrypted track data is not useful to hackers that obtain it by whatever means, and can only be decrypted by a corresponding payment server upon checkout and is not useful otherwise. Contactless Track Data can also be stored in the secure element of the NFC chip at manufacturing or key injection facility, or loaded by the consumer by converting his/her magnetic stripe track data into a contactless track data via the wallet application using special procedure.

Card Read Mode: This mode allows the stored encrypted track data to be retrieved and sent to a corresponding checkout application that accepts card present remote checkout. The reader can also be used by a POS application on the host device to accept payments like any merchant application, by interacting with the Swiper or NFC contactless reader to obtain cardholder data from magstripe cards or from contactless cards.

The unique elements of the invention include the following: 1) the NFC storage mechanism is connected via a ubiquitous audio jack; 2) the loading method to the NFC is much more simple when leveraging a separate magstripe card reader; 3) ability to store not just contactless credentials in the secure element but also regular magnetic stripe track data to be used later in checkout scenarios; 4) ability to change modes of emulation via wallet app as described above; 5) a personal NFC device is combined with a magnetic stripe reader so that the reader can be turned into a personal POS to pay for goods remotely, or turned into a merchant POS for acceptance of cards from other buyers or consumers.

Several embodiments of the present invention have been described. Nevertheless, it will be understood that various modifications may be made without departing from the spirit and scope of the invention. Accordingly, other embodiments are within the scope of the following claims.

What is claimed is:

1. A system for a secure cardholder and storage device comprising:
    a mobile communication device that comprises a mobile wallet application;
    a secure card transporter (SCT) comprising:
        a Near Field Communication (NFC) chip;
        a microprocessor;
        a magnetic stripe card reader;
        a contact chip card reader;
        a contactless card reader;
        an audio jack interface; and
        a micro-USB interface;
    wherein the SCT interfaces with the mobile communication device by either one of the audio jack interface or the micro-USB interface, and wherein the mobile wallet application initializes and unlocks the SCT; and
    wherein the SCT captures payment card data and transmits the captured payment card data to a merchant point of sale (POS) checkout system.

2. The system of claim 1, wherein the mobile communication device further comprises a payment checkout application that interacts with the SCT and accepts payment card data from the SCT.

3. The system of claim 1, wherein the mobile wallet application interacts with the SCT to provide more than one mode of operation, and wherein the more that one mode of operation comprises card emulation mode, card load mode and card read mode.

4. The system of claim 3, wherein the SCT operated in the card emulation mode is configured to allow a user to select a specific payment card and to change payment cards via the mobile wallet application for payment at the merchant POS system.

5. The system of claim 3, wherein the SCT operated in the card load mode is configured to allow a user to load payment card data and to store the loaded payment card data onto a secure element of the NFC chip and onto an online digital wallet via the mobile wallet application.

6. The system of claim 3, wherein the SCT operated in the card read mode is configured to allow a user to retrieve payment card data and to transmit the retrieved payment card data to the merchant POS system.

7. The system of claim 1, wherein the mobile communication device comprises one of Smartphone, tablet, or personal computer.

8. The system of claim 1, wherein the microprocessor is configured to provide security and communications with the mobile communication device.

9. The system of claim 1, wherein the NFC chip stores payment card data and cardholder data in a secure element.

10. The system of claim 9, wherein the NFC chip is configured to be used as a contactless payment card that is read by the merchant POS checkout system.

11. The system of claim 9, wherein the NFC chip is configured to read contactless payment cards and to transmit payment card data to other SCT devices in a peer-to-peer mode.

12. A system for a secure cardholder and storage device comprising:
   a mobile communication device;
   a secure card transporter (SCT) comprising
      a Near Field Communication (NFC) chip;
      a microprocessor;
      a magnetic stripe card reader;
      a contact chip card reader;
      a contactless card reader;
      a battery;
      a charging circuit;
      an audio jack interface; and
      a micro-USB interface;
   wherein the SCT interfaces with the mobile communication device via the audio jack interface or the micro-USB interface; and
   wherein the SCT captures payment card data and transmits the captured payment card data to a merchant point of sale (POS) checkout system.

13. A method for providing a secure cardholder and storage device, the method comprising:
   providing a mobile communication device that has a mobile wallet application;
   providing a secure card transporter (SCT) comprising
      a Near Field Communication (NFC) chip;
      a microprocessor;
      a magnetic stripe card reader;
      a contact chip card reader;
      a contactless card reader;
      an audio jack interface; and
      a micro-USB interface;
   wherein the SCT interfaces with the mobile communication device via the audio jack interface or the micro-USB interface and the mobile wallet application initializes and unlocks the SCT; and
   wherein the SCT captures payment card data and transmits the captured payment card data to a merchant point of sale (POS) checkout system.

14. The method of claim 13, wherein the mobile communication device further comprises a payment checkout application that interacts with the SCT and accepts payment card data from the SCT.

15. The method of claim 13, wherein the mobile wallet application interacts with the SCT in order to provide mode of operations comprising card emulation mode, card load mode and card read mode.

16. The method of claim 15, wherein the SCT operated in the card emulation mode is configured to allow a user to select a specific payment card and to change payment cards via the mobile wallet application for payment at the merchant POS system.

17. The method of claim 15, wherein the SCT operated in the card load mode is configured to allow a user to load payment card data and to store the loaded payment card data onto a secure element of the NFC chip and onto an online digital wallet via the mobile wallet application.

18. The method of claim 15, wherein the SCT operated in the card read mode is configured to allow a user to retrieve payment card data and to transmit the retrieved payment card data to the merchant POS system.

* * * * *